INVENTOR.
THEODORE S. KEPNER

BY *Russell A. Connor*

AGENT

Nov. 4, 1969 T. S. KEPNER 3,476,946
OPTICAL INTRUSION DETECTION SYSTEM USING DUAL BEAM
PERIPHERAL SCANNING AND LIGHT DIRECTING TUBES
Filed Feb. 19, 1968 3 Sheets-Sheet 2
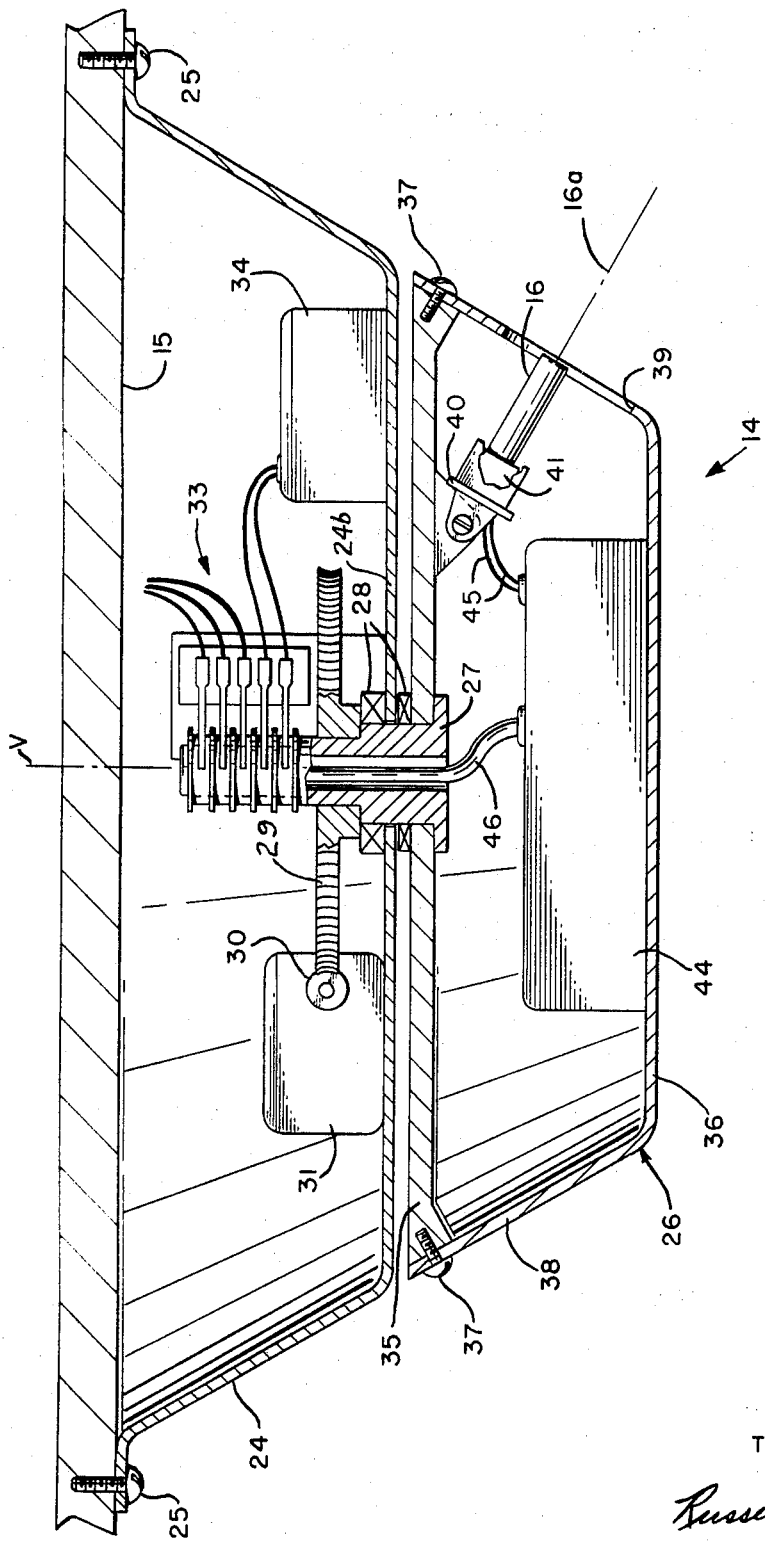
INVENTOR.
THEODORE S. KEPNER
BY *Russell A. Cannon*
AGENT

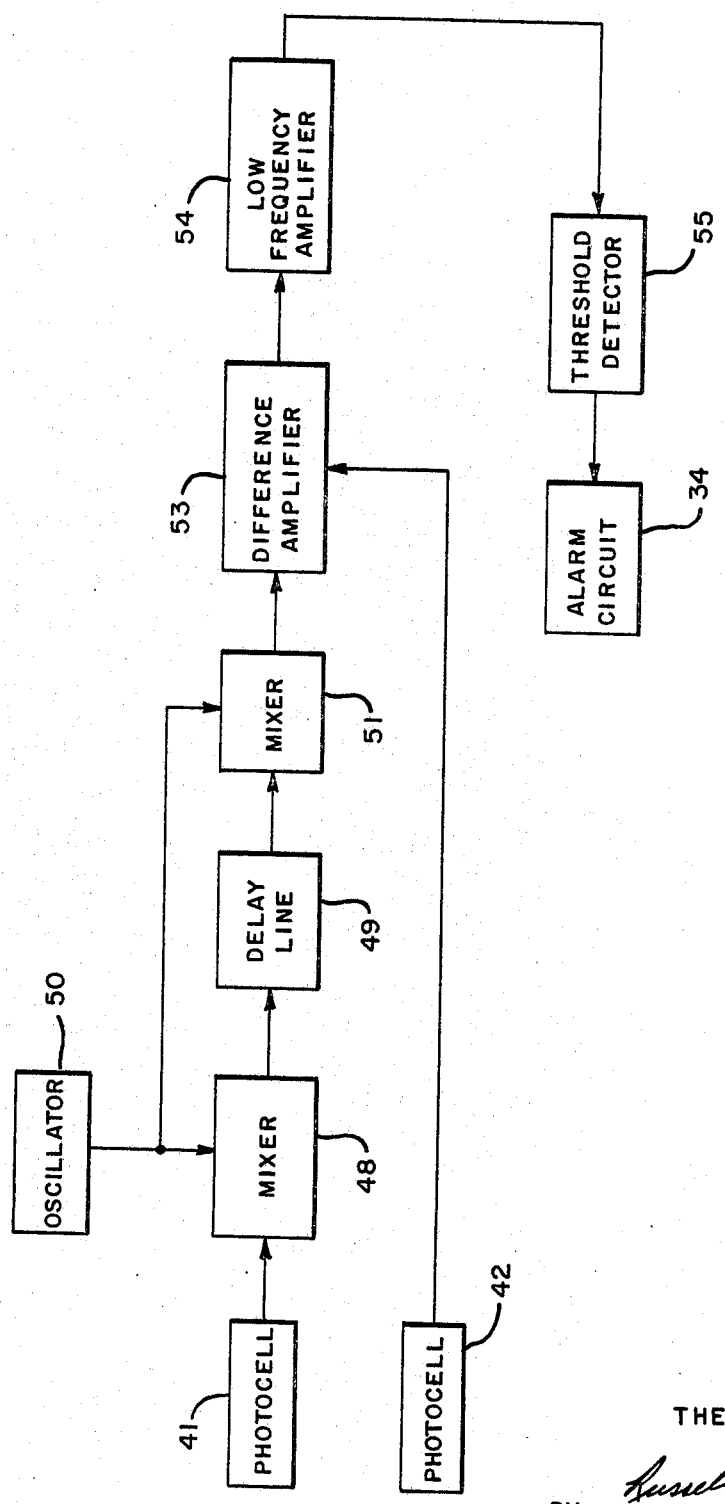

United States Patent Office 3,476,946
Patented Nov. 4, 1969

3,476,946
OPTICAL INTRUSION DETECTION SYSTEM USING DUAL BEAM PERIPHERAL SCANNING AND LIGHT DIRECTING TUBES
Theodore S. Kepner, Sunnyvale, Calif., assignor to Sylvania Electric Products Inc., a corporation of Delaware
Filed Feb. 19, 1968, Ser. No. 706,276
Int. Cl. G01n 21/32
U.S. Cl. 250—224                                   7 Claims

ABSTRACT OF THE DISCLOSURE

Light from two relatively fixed points of a surface bounding the protected area of a room are received through rapidly rotating light directing tubes and photocells located remote from the surface. The rotating photocells successively receive light from all points on a circular band which defines the perimeter of the protected area. The output of the leading photocell is delayed appropriately and is compared with the output of the trailing photocell so that any change in the output of one photocell relative to the other causes an alarm signal to be generated. The length of the time delay is determined by the physical spacing of the two viewed spots on the circular band and the angular velocity of the rotating cells.

BACKGROUND OF THE INVENTION

This invention relates to intrusion detection systems and more particularly to an optical system for determining intrusion into a room or like enclosure.

Protection of a room by an optical system of the type described in Patent No. 3,191,048 generally depends upon the reaction of sensors to relative changes in light intensity in an entire room. While such sensitivity is advantageous for complete volumetric protection, it likewise limits the capability of the system to discriminate against normal light variations in a windowed room caused by sweeping automobile headlights, cloud masking of sunlight or moonlight, and the like. This false alarm problem generally limits the use of such a volumetric intrusion detection system to enclosures having controlled or predictable light environments such as windowless rooms.

An object of this invention is the provision of an optical intrusion detection system which has the detection capability of a modified volumetric system and the discrimination (low false alarm) capability of a narrow optical beam system.

The use of a scanning pencil beam in an optical detection system has been suggested in Patent No. 3,120,654 as a technique for protecting a large area. Such a system requires the installation of many reflectors opposite the transmitter-receiver station which not only limits the application and increases cost but complicates camouflage of the system. Furthermore, the spaces between reflectors are unprotected and to that extent the area under surveillance is vulnerable to penetration.

Another object is the provision of an optical system which provides substantially complete floor to ceiling perimeter protection of a room.

Still another object is the provision of a scanning optical receiver in the form of a lighting fixture.

SUMMARY OF THE INVENTION

An optical receiver has two photosensitive sensors receiving light from two separate small-area spots, respectively, on a remote surface of the lighted room to be protected. The axes of these sensors are synchronized to move rapidly and simultaneously around the perimeter of the room while a fixed spacing is maintained between the two viewed spots. The output from the leading spot sensor is delayed sufficiently to coincide with the output of the trailing spot sensor for light from the same spot and a continuous comparison of these delayed and undelayed outputs is made. If light intensity on one sensor changes relative to that on the other sensor, an alarm circuit is energized. The system thus achieves a high signal to noise ratio while providing essentially volumetric protection with apparatus having the appearance of a lighting fixture.

DESCRIPTION OF THE DRAWINGS

FIGURE 3 is a vertical section of the detection apparatus taken on line 3—3 of FIGURE 1; and FIGURE 4 is a block diagram of the signal processing circuit for the detection apparatus.

DESCRIPTION OF PREFERRED EMBODIMENT

Figure 1:
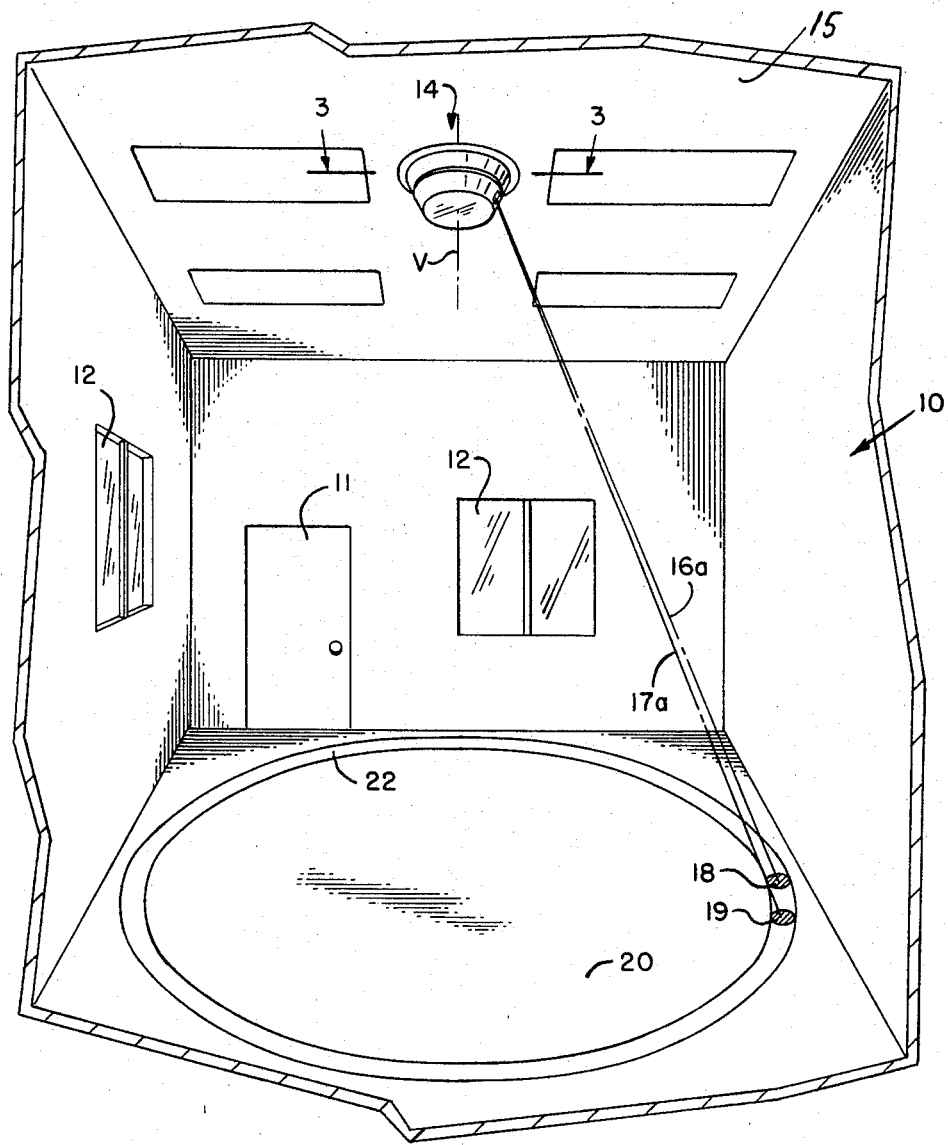
FIGURE 1 is a perspective view of a room partially broken away showing intrusion detection apparatus embodying this invention mounted on the ceiling.

Referring now to the drawings, FIGURE 1 shows a room 10 having a door 11 and windows 12 through which access to the room may be had. Intrusion detection apparatus 14, preferably in the form of a lighting fixture, is mounted on the underside of ceiling 15 and has light directing tubes 16 and 17, see FIGURES 2 and 3, directed downwardly therefrom along axes 16a and 17a for viewing limited-area spots 18 and 19, respectively, on floor 20.

Detection apparatus 14 preferably is located in the center of ceiling 15 with tubes 16 and 17 supported for rotation about a vertical axis V. The tubes are positioned so that their axes 16a and 17a form an angle with the axis V and the spots 18 and 19 on floor within the field of view of the respective tubes move over a circular path or band 22 as the latter rotate. The axes 16a and 17a of the rotating tubes therefore form an imaginary cone having its apex at the ceiling. This cone is the boundary of protection for the room, that is, any change in intensity of light within the field of view of one of the tubes 16 and 17 relative to the other causes the system to alarm. Changes in light intensity outside the fields of view of the tubes has no discernible effect on the system which therefore discriminates against spurious light reflections. If an intruder enters through door 11 and penetrates the imaginary cone or otherwise causes a change in light reflected from band 22 into tubes 16 and 17, this condition is detected by the associated photosensitive detectors and an alarm, such as a bell, flashing light or other device, not shown, is given.

Apparatus 14 is shown in detail in FIGURE 3 and comprises a stationary housing 24 fastened to the ceiling by screws 25 and a rotatable housing 26 supported under stationary housing 24 for rotation about vertical axis V.

Housing 24 encloses a stepped tubular column 27 supported for rotation about axis V on the lower wall 24a of a housing 24 by bearings 28. A drive gear 29 is secured to column 27 and engages a worm 30 driven by motor 31 for rotating the column. Other drive trains having a higher gear ratio may be used, if desired. Slip ring assembly 33 is mounted on the upper part of the column and transfers electrical energy between the rotating and stationary parts of the apparatus. An alarm circuit 34 such as a bell may be mounted in housing 24 as shown or may be located remotely from the apparatus if desired.

Figure 2:
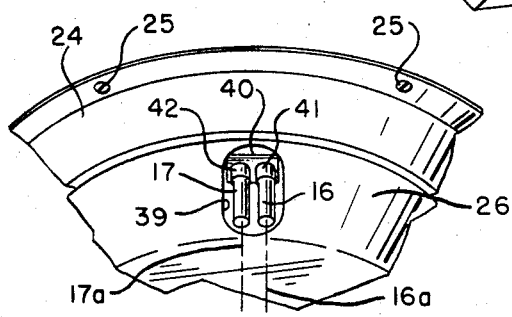
FIGURE 2 is an enlarged perspective view of part of the detection apparatus showing the light directing tubes projecting therefrom.

Housing 26 is secured to and supported on the lower end of column 27 and therefore rotates with the column when motor 31 is energized. The housing comprises a top wall 35 and a dish-shaped closure 36 secured by screws 37 to the outer edge of the top wall. Side wall 38 of closure 36 has a transparent aperture 39 formed therein, and tubes 16 and 17 are supported on housing 26 in alignment with the aperture by a bracket 40. Photocells 41 and 42, see FIGURES 2 and 4, are mounted at the inner ends, respectively, of the tubes and thus are responsive only to the light received through the respective tubes. Bracket 40 is adjustably mounted on top wall 35 to permit adjustment of tubes 16 and 17 and the spots 18 and 19, respectively, in their field of view. A signal processing circuit 44 is mounted within closure 36 and has input leads 45 connected to the photocells and other leads 46 which extend up through column 27 for connection to the slip ring assembly 33 on the upper part of the column. A power source, not shown, and the alarm circuit 34 are connected to the stationary part of assembly 33 and thus are directly electrically connected to circuit 44.

Optical tubes 16 and 17 are essentially simple collimating lenses for directing light from the limited-area spots 18 and 19 of the floor to the respective photocells 41 and 42. Each tube may consist of a hollow plastic straw-like structure, as shown, or may take the form of a meniscus lens mounted on the side wall 38 of closure 36. The inner surface of each tube may be opaque for preventing reflection of light rays thereby which are not parallel to the axis of the tube. The parts contained within housing 26 preferably are symmetrically weight-distributed about axis V so that the rotating parts are dynamically balanced.

The signal processing circuit 44 comprises a mixer 48, see FIGURE 4, connected to the output of the photocell opposite the leading or front rotating optical tube which, by way of example, is tube 16 associated with photocell 41. The output of mixer 48 is delayed by delay line 49 and is combined with the output of oscillator 50 in a second mixer 51. The output of oscillator 50 is also connected to mixer 48. The output of the other or "trailing" photocell 42 is fed directly by line 52 to a difference amplifier 53 to which the output of mixer 51 is connected. Amplifier 53 compares the delayed output of photocell 41 with the undelayed output of photocell 42 and produces a Doppler-type output signal if an intruder enters the protected room and changes the light reflected from the same spot on band 22 to the photocells. In the absence of such a change in light, the output of difference amplifier 53 is effectively zero. A low frequency amplifier 54 passes the output of the difference amplifier to a threshold detector 55 which activates an alarm circuit 34 if the predetermined level has been exceeded to indicate an intrusion.

The period or time delay of delay line 49 is related to the angular velocity of tubes 16 and 17 and the spacing of the viewed spots 18 and 19 on the floor such that the outputs of the photocells when receiving light from the same spot are compared in difference amplifier 53. In other words, the time required for the lead cell 41 and trailing cell 42 to traverse the same spot on the floor is substantially the period of the delay line 49. The outputs of the two sensors are thus conditioned for detecting any change in light received from the same limited floor area from the time that area is viewed by the lead cell until the trailing cell views it. By way of example, in a system scanning a circular band 22 having a mean radius of 100 feet at an angular velocity of 1800 revolutions per minute and an arcuate spacing between viewed spots 18 and 19 of 1 foot would utilize a delay line having a period of 500 microseconds.

In operation, motor 27 is energized by a remote switch and continuously rotates closure 36 so that optical tubes 16 and 17 scan the band 22 on the floor of the protected room. A conventional lamp or fixture may be used to illuminate the room so that the intensity of light reflected from any spot on band 22 to the phototubes is relatively constant. The entry of an intruder through door 11 or windows 12 changes light detected by scanning tubes 16 and 17 to produce an error signal from difference amplifier 53 and give an alarm. In order to increase spurious signal discrimination capability, the sensitivity of the system may be adjusted to a low level by increasing the threshold of detector 55 so that an alarm is given only by penetration of the protective cone by an intruder. The alarm circuit may be located remotely at a central guard station or may consist of a connection to telephone lines, remote display devices, or other monitoring apparatus as may be required or desired.

Changes, modifications and improvements to the above described embodiment of the invention may be made by those skilled in the art without departing from the spirit and scope of the invention. The appended claims describe the novel features of the invention.

I claim:

1. Apparatus for detecting changes in light from a boundary of a room to be protected, comprising
    a stationary housing rigidly secured to one of the walls of said room,
    a column supported in said housing for rotation about the longitudinal axis of the column,
    a motor rigidly supported on said stationary housing and coupled to said column for rotating same,
    an electro-optical transducer assembly rigidly secured to said column for rotation therewith and at any one instant being responsive to light received from two separate spots spaced apart on the boundary and producing first and second electrical outputs proportional to the intensity of light received from associated spots, rotation of said assembly causing light to be received from different spots on the boundary, said assembly in succession receiving light from the same spot on the boundary,
    a signal processor receiving the outputs of said assembly produced by light from the same spot on the boundary for comparing these outputs, and
    a utilization device responsive to the output of the processor for indicating instrusion of the protected area of the room.

2. Apparatus according to claim 1 wherein said signal processor is rigidly secured to said column for rotation therewith.

3. Apparatus according to claim 2 wherein said transducer assembly comprises first and second photocells rigidly secured to said column for rotation therewith, each of said photocells having a photosensitive surface receiving parallel light rays directed thereto from a different one of the two separate spots on the boundary, said photocells in succession receiving light from the same spot.

4. Apparatus according to claim 3 wherein said electro-optical transducer assembly comprises first and second hollow tubular members rigidly secured to said column for rotation therewith, each of said members being open at opposite ends thereof and associated with a different one of said photocells, one end of each member located adjacent the photosensitive surface of the associated photocell, the other end of each member viewing a different spot on the boundary for directing light from the spot to the photosensitive surface of the photocell.

5. Apparatus according to claim 4 wherein said signal processor comprises
- a delay circuit responsive to the output of the leading photocell to light from a given spot for delaying this output a period equal to the time from said response of the leading photocell until response of the lagging photocell to light from the same spot, and
- a difference circuit responsive to the delayed and undelayed outputs of the photocells for comparing these outputs.

6. Apparatus according to claim 5 wherein said utilization device comprises
- an alarm circuit rigidly secured to said housing, and
- slip rings secured to said column and said housing coupling the output of said processor to said alarm circuit.

7. Apparatus according to claim 6 wherein said tubular members each have an opaque inner surface for preventing reflection of light therefrom.

References Cited

UNITED STATES PATENTS

| | | | |
|---|---|---|---|
| 2,493,543 | 1/1950 | Merchant | 340—276 X |
| 3,120,654 | 2/1964 | Lee. | |
| 3,191,048 | 6/1965 | Lowen | 340—285 X |

RALPH G. NILSON, Primary Examiner

C. M. LEEDON, Assistant Examiner

U.S. Cl. X.R.

340—228, 276